United States Patent [19]

Broome et al.

[11] Patent Number: 4,591,003
[45] Date of Patent: May 27, 1986

[54] OFFSET HARROW

[75] Inventors: Mark W. Broome, Rockmart; George R. McKemie, Rome, both of Ga.

[73] Assignee: Rome Industries, Inc., Cedartown, Ga.

[21] Appl. No.: 702,013

[22] Filed: Feb. 15, 1985

[51] Int. Cl.$^4$ .............................................. A01B 23/04
[52] U.S. Cl. .................................... 172/597; 172/580; 172/466
[58] Field of Search ............... 172/584, 596, 580, 466, 172/585, 597, 315–317, 320, 324, 595

[56] References Cited

U.S. PATENT DOCUMENTS

| | | | |
|---|---|---|---|
| 1,919,080 | 7/1933 | Stewart | 172/597 |
| 2,685,159 | 8/1954 | Brundage | 172/596 X |
| 2,759,310 | 8/1956 | Newkirk | 172/597 |
| 3,439,750 | 4/1969 | McKay | 172/597 X |
| 3,572,445 | 3/1971 | Richey | 172/597 |
| 3,643,743 | 2/1972 | Fuselein | 172/580 |
| 4,308,919 | 1/1982 | Coughran | 172/240 |

Primary Examiner—Richard J. Johnson
Attorney, Agent, or Firm—Newton, Hopkins & Ormsby

[57] ABSTRACT

Forward and rear gang disc harrow carriers are hingedly joined near corresponding ends by a vertical axis hinge structure. Near their other corresponding ends, the gang disc harrow carriers are interconnected through a four element linkage having an operating cylinder and a latch bar whereby the carriers can be positioned at varying prescribed angles for working the soil and in parallel locked relationship for transport. Transport wheels are pivotally attached to the rear carrier and are equipped with power cylinders which raise and lower the wheels for lowering and raising the rear carrier. The front carrier has a pivotal connection with a drawbar and another power cylinder is connected between the drawbar and front carrier and is operable to raise and lower the front carrier.

14 Claims, 5 Drawing Figures

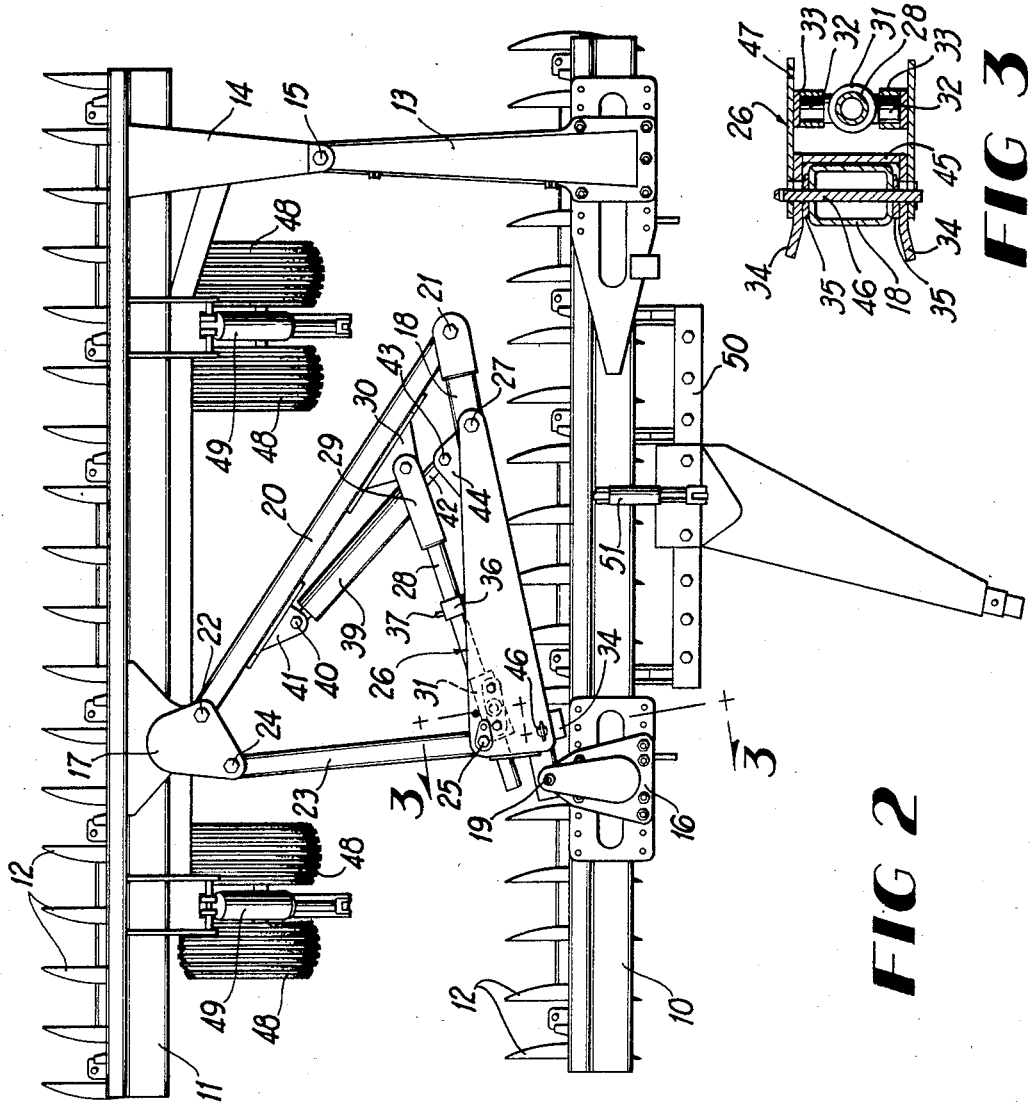

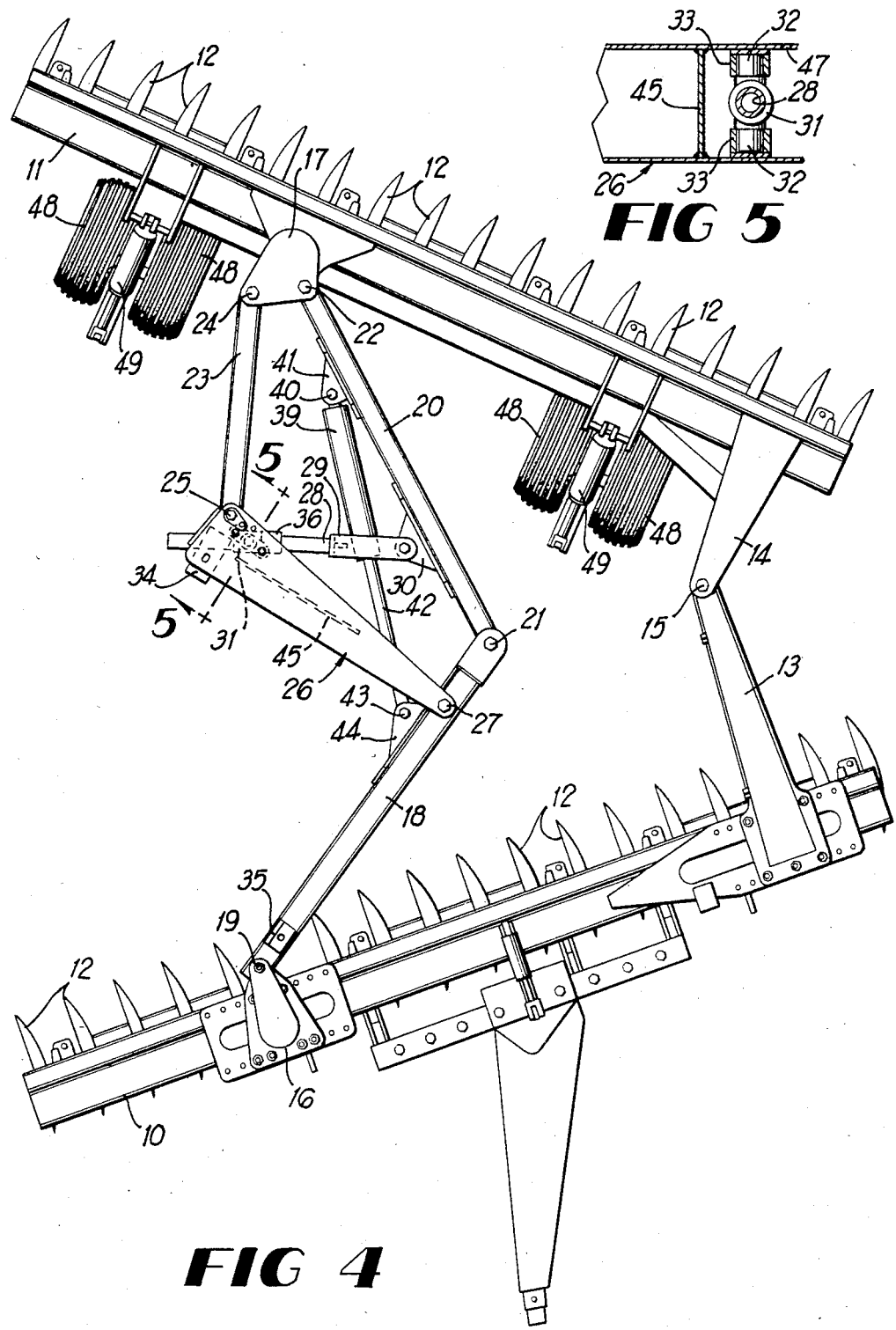

OFFSET HARROW

BACKGROUND OF THE INVENTION

The objective of the present invention is to provide an offset harrow of the hinged and wheeled type which possesses greater stability and ease of operation than the prior art.

More particularly, it is the object of the invention to improve the construction and mode of operation of the harrow disclosed in U.S. Pat. No. 4,308,919. That patent discloses an offset harrow of the hinged and wheeled type which is operated by a two element collapsible toggle linkage equipped with a power cylinder. It has been found that the two element toggle linkage provides somewhat less than the desirable stability of operation for the offset harrow and a less than adequately convenient arrangement for locking the forward and rear disc harrow units in their parallel transport positions. The present invention eliminates these drawbacks of the prior art by providing a very stable and reliable four element operating linkage connected between the forward and rear hinged carriers or harrow units. This improved linkage includes a support member or link for an adjustable latch or movement limiting bar which provides convenient and positive means of regulating the working angle between the forward and rear hinged harrow units through a desirable range of angles.

The improved linkage greatly facilitates locking the hinged harrow units in their parallel transport positions by rendering it much easier to insert and extract a locking pin through the latch bar support link and the adjacent front stablizer. The fact that the linkage elements are interengaged to support each other enables proper alignment of the holes which receive the linkage locking pin, thus achieving an improvement over the prior patented device where installation and extraction of a linkage locking pin proved to be difficult in many cases due to misalignment of pin receptor openings.

Still another object of the invention is to provide an offset harrow allowing for a plurality of working angles between the front and rear harrow disc carriers along with easier and more efficient means for setting the desired working angle between the carriers.

Still another object of the invention is to provide an efficient and reliable operating linkage for the hinged units of an offset harrow which is compactly arranged, and sturdy and durable.

Other features and advantages of the present invention will become apparent to those skilled in the art during the course of the following description.

BRIEF DESCRIPTION OF THE DRAWINGS

FIG. 2 is a plan view of the harrow and linkage in the transport position.

FIG. 3 is a fragmentary vertical section taken on line 3—3 of FIG. 2.

FIG. 4 is a plan view of the harrow and linkage in a selected soil working position.

FIG. 5 is a fragmentary vertical section taken on line 5—5 of FIG. 4.

DETAILED DESCRIPTION

Figure 1:
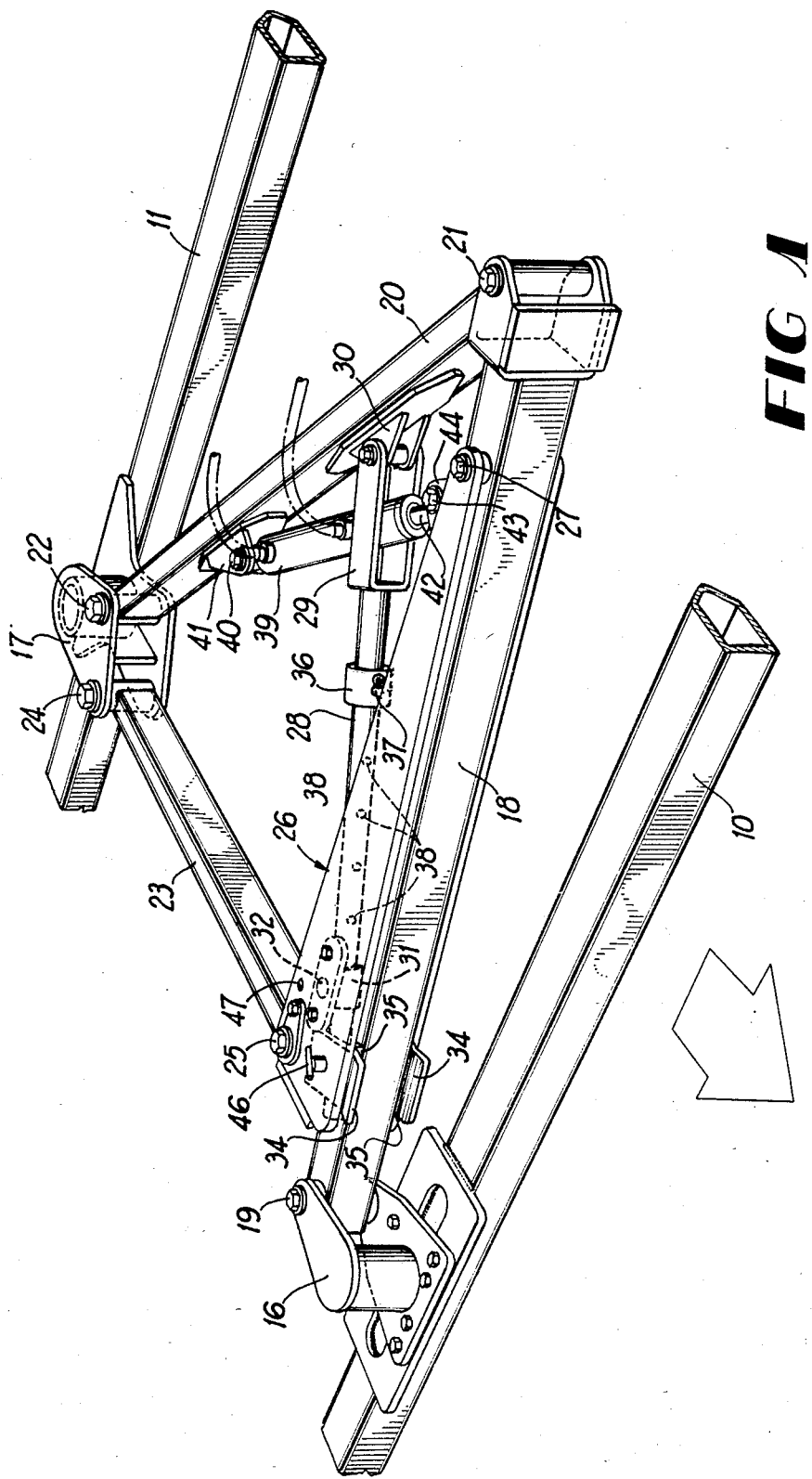
FIG. 1 is a fragmentary perspective view of an operating and locking linkage for an offset harrow according to the invention.

Referring to the drawings in detail wherein like numerals designate like parts throughout the same, a hinged and wheeled offset harrow of the general type disclosed in U.S. Pat. No. 4,308,919 is illustrated. The harrow comprises front and rear carriers 10 and 11, each adapted to be equipped with a gang of harrow discs 12, FIG. 2, installed thereon in a conventional manner. Near corresponding ends, the carriers 10 and 11 have forward and rear hinge coupling arms 13 and 14 fixed thereto. These arms are hingedly connected by a vertical axis hinge element 15.

Toward their opposite ends, the carriers 10 and 11 have sturdy anchors 16 and 17 fixed thereto. A front stabilizer 18 has one end pivotally coupled to the anchor 16 through a vertical axis pivot 19, while its other end is pivotally coupled to a rear stabilizer 20 by a floating vertical axis pivot element 21. The other end of the rear stabilizer 20 is pivotally coupled to the anchor 17 by a vertical axis pivot element 22, as shown.

A support beam 23 somewhat shorter than the stabilizers 18 and 20 has its rear end pivotally coupled to the anchor 17 by another vertical axis pivot element 24. The forward end of the support beam 23 is pivotally connected to another vertical axis pivot element 25 with one corner of an elongated generally triangular channel cross-section latch support link 26. The far end of the latch support link 26 is pivotally coupled through another vertical axis pivot element 27 with the front stabilizer 18 close to, but spaced somewhat from, the pivot 21.

A latch bar 28, forming an important feature of the invention, includes a bifurcated end 29 which is pivotally coupled to an anchor 30 on the rear stabilizer 20. The other end portion of the latch bar 28, which is cylindrical, carries a sliding sleeve 31, FIGS. 3 and 5, which is self-adjusting along the latch bar during the operation of the linkage. The sleeve 31 is equipped with top and bottom vertical axis trunnions 32 which are received rotationally in fixed bushings 33 on the interior faces of the channel cross-section latch support link 26 near and spaced from the pivot 25. As shown most clearly in FIG. 1, the two side walls of latch support link 26 can closely straddle the front stabilizer 18 when the harrow is in the transport mode with the carriers 10 and 11 parallel. To facilitate smooth and stable straddling of the front stabilizer 18 by the link 26, the latter is equipped near one end with a pair of divergent shoes 34, or wear plates, which are adapted to smoothly ride over tapered wear plates 35 fixed to the top and bottom faces of the front stabilizer 18.

An adjustable collar 36 on the latch bar 28 is slidable along the latch bar and releasably locked in any of several selected positions by a removable pin 37 which can be inserted through any of several collar positioning apertures 38 provided in the latch bar 28.

During the operation of the linkage, the latch bar 28 can slide axially through the sleeve 31 which is swiveled on the latch bar support link 26, as described. When the carriers 10 and 11 have hingedly expanded to a desired working angle, such as 40°, the collar 36 will solidly abut the sleeve 31 and this will preclude any further separation of the carriers 10 and 11 and will establish a precision angular relationship of the disc carriers. The locator apertures 38 of latch bar 28 are arranged to allow positioning of the collar 36 in several different working positions, whereby the carriers 10 and 11 can be held at a maximum included angle of 45° or a minimum angle of 30°. They may also be held at 35° and 40° included angles by means of the collar 36. The collar 36 does not preclude the closing of the carriers 10 and 11 to their parallel transport positions, FIG. 2, because during such closing the collar 36 is moving away from the sleeve 31. Therefore, the collar 36 can only coact with the sleeve 31 to form a positive stop for limiting the separation of the carriers 10 and 11 at selected angular soil-working positions.

The linkage composed of the elements 18, 20, 23, 26 and Z8 is operated by a power cylinder 39 which is pivotally connected as at 40 to an anchor 41 fixed to the rear stabilizer 20 near one end thereof. The rod 42 of cylinder 39 is similarly pivoted as at 43 to an anchor 44 provided on the front stabilizer 18.

When the rod 42 is retracted into the cylinder body, the linkage elements 18, 20, 23 and 26 assume a collapsed triangular configuration as shown in FIGS. 1 and 2. The harrow disc carriers 10 and 11 are now parallel an.d positioned for transport. The latch bar support link 26 is engaged with and straddling the front stabilizer 18. An internal web 45, FIG. 4, of the link 26 serves to limit the straddling engagement of this link with the front stabilizer 18 by contact with the opposing face of the front stabilizer. The latch bar 28 is now roughly parallel to the front stabilizer and is in crossing relationship to the cylinder 39, which is roughly parallel to the rear stabilizer 20. The bifurcated portion 29 of the latch bar 28 receives the power cylinder 39 therethrough and this renders the total linkage compact with all of its components operating in a common horizontal plane under control of the cylinder 39.

When the rod 42 is extended, as shown in FIG. 4, the linkage expands or opens, as illustrated, and the carriers 10 and 11 separate to a predetermined working angle, as previously explained, the adjustable collar 36 moving into engagement with the sleeve 31 when the proper working angle is reached.

When the linkage and the carriers 10 and 11 are in the transport position, FIGS. 1 and 2, a locking pin 46, preferably equipped with a handle, is easily placed through aligned openings in the front stabilizer 18, the top and bottom walls of latch support link 26 and the elements 34 and 35, as shown in FIG. 3. This locks the harrow securely and safely in the transport mode. When it is required to release the linkage for movement to the soil-working mode, the pin 46 is manually pulled and is simply placed within a pin retainer opening 47, FIG. 1, provided in the link 26. The locking pin 46 does not bind or resist installation or removal, as it did in the prior art, because of the stacked self-supporting relationship of the linkage parts and the accurate registration of the pin receiving apertures, FIG. 3, once the link 26 is moved into its straddling relationship with the front stabilizer 18.

The rear carrier 11 is equipped with vertically swingable ground wheels 48 and power cylinders 49, FIG. 2, substantially in accordance with the teaching of U.S. Pat. No. 4,308,919. Similarly, a vertically swingable drawbar 50 on the front carrier 10 is connected with the front carrier by a power cylinder 51, as described in the aforementioned patent. This allows the carriers 10 and 11 to be independently raised and lowered, as described in the patent.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A harrow comprising front and rear gang carriers, means hingedly connecting said gang carriers near corresponding ends so that they may swing one relative to the other in a horizontal plane, a power linkage interconnecting said gang carriers near their other corresponding ends, said power linkage comprising front and rear stabilizers having pivotally connected ends and having other ends which are pivotally connected to the front and rear gang carriers whereby such carriers and said stabilizers may move in a common horizontal plane, a support beam having one end pivotally connected with the rear gang carrier, a latch support link having a pivotal connection with the other end of said support beam and also being pivotally connected to the front stabilizer to move therewith in said common horizontal plane, a latch bar having swiveled sliding engagement with said latch support link and being pivotally connected with the rear stabilizer, an adjustable and lockable stop member on the latch bar serving to limit swinging movement of said gang carriers away from each other, and an extensible and retractable power device connected between said front and rear stabilizers and being operable to move the stabilizers in said common horizontal plane to position the harrow for transport and for soil-working.

2. A harrow as defined in claim 1, and means to releasably lock said latch support link to said front stabilizer to maintain the harrow in the transport position.

3. A harrow as defined in claim 2, and said means comprising a locking pin engaging through aligned apertures of the latch support link and front stabilizer, the latch support link having a channel formation and being adapted to straddle the top and bottom faces of the front stabilizer and including a web engaging one side wall of the front stabilizer to place the apertures of the latch support link and front stabilizer in accurate registration to receive the locking pin and enable its ready removal.

4. A harrow as defined in claim 3, and somewhat divergent shoe elements on the top and bottom of the latch support link and being engageable with tapered wear plates on the top and bottom faces of the front stabilizer to assist the latch support link in swinging into straddling engagement with the front stabilizer.

5. A harrow as defined in claim 1, and vertically swingable power-operated ground wheels at least on the rear gang carrier.

6. A harrow as defined in claim 5, and a vertically swingable power-operated drawbar means on the front gang carrier.

7. A harrow as defined in claim 1, and said power device comprising a power cylinder in crossing relationship with the latch support link, and the latch support link being bifurcated to receive the power cylinder in crossing relationship, whereby the power linkage can operate in a horizontal plane common to all of its components.

8. A harrow comprising front and rear gang carriers which are hingedly connected in spaced relationship near corresponding ends, a power linkage operable in a common plane with the front and rear gang carriers and interconnecting the gang carriers near their other corresponding ends, said power linkage comprising front and rear stabilizer bars which are pivotally connected and which have corresponding ends pivotally connected to anchors on the front and rear gang carriers, a support beam having one end pivotally connected to the anchor on the rear gang carrier, a latch support link pivotally connected with the other end of said support beam and also pivotally connected to the front stabilizer near the pivotal connection of the front stabilizer to the rear stabilizer, a latch bar having swiveled sliding engagement with the latch support link near the pivotal connection of the latter to the support beam, the latch bar being pivotally connected to the rear stabilizer, a longitudinally adjustable and lockable stop member on the latch bar positively limiting sliding movement of the latch bar relative to the latch support link in one direction, and an extensible and retractable power device for said linkage connected between said front and rear stabilizers.

9. A harrow as defined in claim 8, and the latch bar having a sleeve slidably mounted thereon and the sleeve having top and bottom trunnions rotatably engaged with bearings on the top and bottom walls of the latch support link, and said adjustable and lockable stop member comprising a stop collar on the latch bar adapted to abut one end face of said sleeve, and means to fixedly and releasably position said stop collar in a series of positions along the length of the latch bar.

10. A harrow as defined in claim 9, and the last-named means comprising a series of collar positioning openings in the latch bar in spaced relationship along its length, a cooperative positioning opening in the stop collar adapted to register selectively with any of the positioning openings in the latch bar, and a locking pin engageable through said openings of the latch bar and stop collar when the openings are in registration.

11. A harrow as defined in claim 8, and vertically adjustable transport wheel and drawbar means on the rear and front gang carriers respectively.

12. A harrow as defined in claim 8, and means to releasably lock the latch support link to the front stabilizer substantially in adjacent coextensive parallel relationship.

13. A harrow as defined in claim 12, and the last-named means comprising a locking pin engageable through registering locking openings formed in the latch support link and said front stabilizer.

14. A harrow comprising front and rear gang carriers which are hingedly connected in spaced relationship near corresponding ends, a power linkage operable in a common plane with the front and rear gang carriers and interconnecting the gang carriers near their other corresponding ends, said power linkage comprising front and rear stablizer bars which are pivotally connected and which have corresponding ends pivotally connected to anchors on the front and rear gang carriers, a support beam having one end pivotally connected to the anchor on the rear gang carrier, a latch support link pivotally connected with the other end of said support beam and also pivotally connected to the front stablizer, a latch bar having swiveled sliding engagement with the latch support link near the pivotal connection of the latter to the support beam, the latch bar being pivotally connected to the rear stablizer, and a longitudinally adjustable and lockable stop member on the latch bar positively limiting sliding movement of the latch bar relative to the latch support link in one direction.

* * * * *